US012623936B2

(12) United States Patent
      Rowhani

(10) Patent No.: US 12,623,936 B2
(45) Date of Patent: May 12, 2026

(54) CHEMICAL DISPENSERS FOR PROLONGED WATER TREATMENT

(71) Applicant: INNOVATIVE WATER CARE, LLC, Alpharetta, GA (US)

(72) Inventor: Touraj Rowhani, Alpharetta, GA (US)

(73) Assignee: INNOVATIVE WATER CARE, LLC, Alpharetta, GA (US)

( * ) Notice: Subject to any disclaimer, the term of this patent is extended or adjusted under 35 U.S.C. 154(b) by 634 days.

(21) Appl. No.: 17/934,662

(22) Filed: Sep. 23, 2022

(65) Prior Publication Data

US 2023/0101118 A1     Mar. 30, 2023

Related U.S. Application Data

(60) Provisional application No. 63/248,084, filed on Sep. 24, 2021.

(51) Int. Cl.
     C02F 1/68 (2023.01)
     *C02F 103/42* (2006.01)

(52) U.S. Cl.
     CPC .......... C02F 1/688 (2013.01); *C02F 2103/42* (2013.01)

(58) Field of Classification Search
     CPC .......... C02F 1/68; C02F 1/72; C02F 2103/42; C02F 2303/04; C02F 1/00; C02F 1/50; E04H 4/16; E04H 4/12; B01F 1/00; B01F 21/22; B01F 35/50; B01D 11/02
     See application file for complete search history.

(56) References Cited

U.S. PATENT DOCUMENTS

| | | | |
|---|---|---|---|
| 3,598,536 A | 8/1971 | Christensen | |
| 4,825,528 A | 5/1989 | Nicholson et al. | |
| 4,917,868 A * | 4/1990 | Alexander | B01F 21/22 |
| | | | 422/119 |
| 5,055,183 A | 10/1991 | Buchan | |
| 5,476,116 A | 12/1995 | Price et al. | |
| 5,810,043 A | 9/1998 | Grenier | |
| 6,123,842 A | 9/2000 | Buchan | |
| 6,432,371 B1 * | 8/2002 | Oliver, Jr. | C02F 1/76 |
| | | | 210/242.1 |

(Continued)

OTHER PUBLICATIONS

ISA/US, International Search Report and Written Opinion issued in Int. Appl. No. PCT/US2022/076911 mailed Dec. 23, 2022.

*Primary Examiner* — Bobby Ramdhanie
(74) *Attorney, Agent, or Firm* — Ingrassia, Fisher & Lorenz LLP

(57) ABSTRACT

Chemical dispensers are provided that include a hollow body member including a bottom end configured to be disposed below a waterline and a top end configured to be disposed above the waterline. The hollow body member defines an interior space disposed between the bottom end and the top end that is configured to accept, through the top end, and hold therein a dissolvable chemical. The dispenser includes a buoyancy member surrounding the hollow body member and configured to provide buoyancy to the dispenser when placed in a body of water such that a first portion of the interior space remains above the waterline and a second portion of the interior space submerges below the waterline. An opening in the hollow body member allows sufficient water flow into the interior space below the waterline such that dissolution or partial dissolution of the dissolvable chemical below the waterline occurs.

18 Claims, 7 Drawing Sheets

(56)  References Cited

U.S. PATENT DOCUMENTS

| | | | |
|---|---|---|---|
| 6,855,300 B2 * | 2/2005 | Cormier | C02F 1/688 |
| | | | 441/24 |
| 7,922,982 B1 * | 4/2011 | Brennan | B01F 21/22 |
| | | | 210/242.1 |
| 10,293,310 B2 | 5/2019 | Blanchette et al. | |
| 2008/0217258 A1 * | 9/2008 | Buchan | B01F 21/22 |
| | | | 210/167.11 |
| 2010/0059421 A1 * | 3/2010 | Reed | C02F 1/688 |
| | | | 210/86 |
| 2016/0330972 A1 | 11/2016 | Hani et al. | |
| 2018/0133666 A1 * | 5/2018 | Blanchette | B01F 25/25 |

* cited by examiner

CHEMICAL DISPENSERS FOR PROLONGED WATER TREATMENT

CROSS REFERENCE TO RELATED APPLICATIONS

This application claims the benefit of U.S. Provisional Application No. 63/248,084, filed Sep. 24, 2021.

INTRODUCTION

The present invention generally relates to water treatment, and more particularly relates to a chemical dispenser for preparing a chemical solution and dispersing the chemical solution in a body of water over a prolonged period of time.

The water in pools, spas, and other managed bodies of water often require applications of chemicals, such as disinfectants and conditioners, to keep the water safe and conducive for use. This is particularly true in bodies of water such as pools and spas in which people swim and otherwise come in direct contact with the water. However, adding disinfecting chemicals, such as chlorine, to a swimming pool requires a careful balance. The concentration of disinfecting chemicals should remain largely harmless and non-irritating to those using the water. Thus, ideally, the disinfecting chemicals must produce sufficient disinfecting effects when present in small concentrations. Concurrently, the water must retain an adequate concentration of chemicals over time to counter newly added pathogens, e.g., viruses and bacteria brought in by swimmers, and to stave off biological growth, such as that from algae blooms.

Chlorine- and/or bromine-based disinfectants are the most frequently applied disinfectants and oxidizers for pool and spa treatment. These chemicals largely disable harmful pathogens and limit the growth of undesirable organisms, such as algae, bacteria, mold, fungi, and viruses. When used to maintain disinfected water, the concentration of chlorine/bromine should remain fairly stable, as levels that are too high or low may lead to issues. For example. if the concentration of chlorine falls too low, the water will not be adequately sterilized. However, if the concentration of chlorine is too high, the excess disinfectant may cause, for example, irritation to the eyes and mucous membranes of anyone entering the water.

One popular means for dispersing chemicals into, for example, pools and spas involves the use of chlorine/bromine in tablet form. Often, these tablets are placed into a floating chemical disperser. These devices include a number of apertures or openings in the body of the device into which water enters and contacts the tablets. This causes the tablets to dissolve and release disinfecting chemicals into the surrounding water.

Many of these floating chemical dispensers include no provision to control the rate at which the tablets dissolve and release chemicals into the surrounding water. More sophisticated versions include a means for opening or closing the apertures to limit the amount of water that flow into the device, and thus the rate at which the chemical disperses. Thus, at best, the only existing way to prolong dissolution of the tablets, and the corresponding chemical release, is to limit the flow of water contacting the tablets. This means a necessary reduction in the rate at which chemical is dispersed from the device, which causes a corresponding decrease in the concentration in the body of water. This can lead to an inadequate concentration to sufficiently disinfect a pool or spa.

Alternatively, the apertures can be opened to allow more water flow, but this requires frequent tablet changes. These chemicals must be replenished manually by the pool owner or pool maintenance service. This can be time consuming and/or a large expense to the pool owner.

Accordingly, it is desirable to provide a device that can maintain an adequate release of chemicals over a prolonged period relative to existing, floating chemical dispensers. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A chemical dispenser is provided for preparing a chemical solution. The dispenser includes a hollow body member including a bottom end configured to be disposed below a waterline and a top end configured to be disposed above the waterline. The hollow body member defines an interior space disposed between the bottom end and the top end. The interior space is configured to accept, through the top end, and hold therein a dissolvable chemical. The dispenser also includes a buoyancy member surrounding the hollow body member and configured to provide buoyancy to the chemical dispenser when the chemical dispenser is placed in a body of water such that a first portion of the interior space remains above the waterline and a second portion of the interior space submerges below the waterline. An opening in the hollow body member allows sufficient water flow into the interior space below the waterline such that dissolution or partial dissolution of the dissolvable chemical below the waterline occurs.

A chemical dispenser is provided for preparing a chemical solution. The dispenser includes a tubular container including a sidewall, a bottom end configured to be disposed below a waterline, and an open top end configured to be disposed above the waterline, an interior space defined by the tubular container between the bottom end and top end, the interior space configured to accept through the open top end a dissolvable chemical, an annular buoyancy member surrounding the tubular container to provide buoyancy to the chemical dispenser such that when placed on a body of water a first portion of the interior space proximal to the open top remains above the waterline and a second portion of the interior space proximal to the bottom end remains below the waterline, and apertures defined in the sidewall and configured to allow water flow into the interior space below the waterline, and dissolution or partial dissolution of the dissolvable chemical below the waterline.

Furthermore, other desirable features and characteristics of the chemical dispensers will become apparent from the subsequent detailed description and the appended claims, taken in conjunction with the accompanying drawings and the preceding background.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

By way of overview, the present invention provides a chemical dispenser that disperses a chemical solution, such as disinfecting chemicals or conditioners into a managed body of water, such as, but not limited to, a pool or a spa. The dispenser includes an interior space that may be loaded with solid, dissolvable chemical in a vertical stack, pile, or the like. The dispenser is configured to allow water to enter this interior space through one or more openings or apertures in the body of the dispenser. Advantageously, when placed on a body of water, the dispenser is configured such that a first portion of this interior space remains above the waterline and a second portion remains below.

Accordingly, dissolvable chemical proximate the top end of the dispenser preferably resides above the waterline, while the dissolvable chemical proximate the bottom end of the dispenser remains below the waterline. With this arrangement, the dissolvable chemical above the waterline typically receives little or no water contact, and thus dissolves at a slower rate and/or avoids dissolution altogether. Nevertheless, as the dissolvable chemical below the waterline begins to dissolve, the dissolvable chemical supported above the waterline begins to settle below the waterline. This, in turn, causes the remainder of the dissolvable chemical to dissolve.

It has now been surprisingly found that the dispenser as described herein, is effective in administering the dissolvable chemical from the dispenser into water in a slow dissolving manner to form the chemical solution. The chemical solution may be a water treating solution for administration to a managed body of water, such as, but not limited to, a swimming pool, a spa, or water features such as recirculating water fountains.

Figure 1:
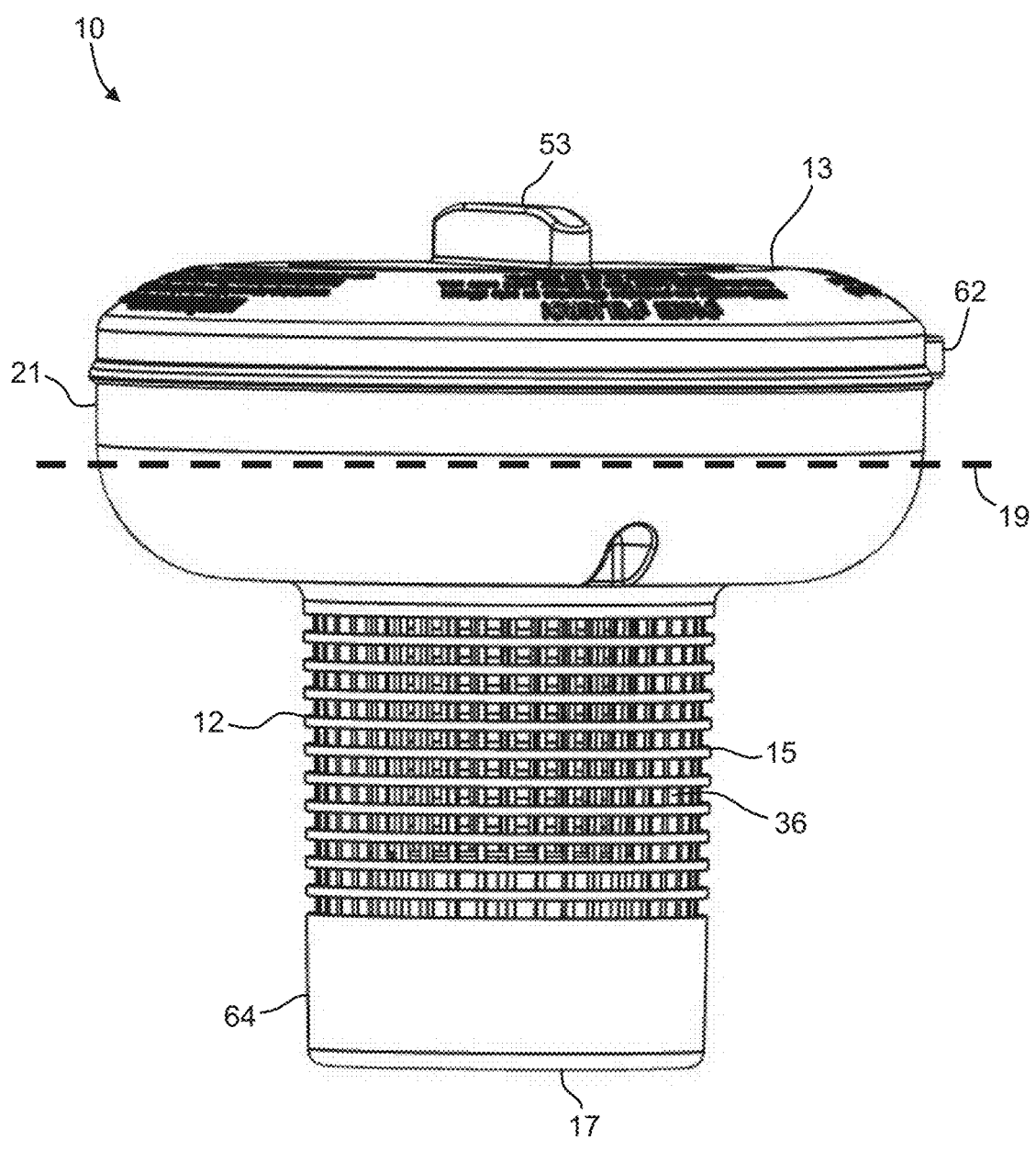
FIG. 1 shows a side view of an exemplary chemical dispenser in accordance with an embodiment.

FIG. 1 shows an exemplary chemical dispenser, referred to herein as the device 10, for dissolving a solid, dissolvable chemical to form a chemical solution and dispersing the chemical solution into a surrounding body of water. The exemplary device 10 includes a hollow body member 12, which may be a tubular body member or container. The hollow body member 12 includes a top end 13 and a bottom end 17 oppositely positioned from the top end 13. As shown in FIG. 1, the top end 13 and the bottom end 17 are connected to one another by the sidewall 15.

Although the exemplary device 10 includes the top end 13 and the bottom end 17 with of a round shape and the correspondingly round sidewall 15, in certain embodiments either the top end 13 or the bottom end 17 may be shaped to have any polygonal cross-sectional shape (e.g., a triangle, a square, a pentagon, a rectangle, or a hexagon). Consequently, to connect the top end 13 and the bottom end 17, the sidewall 15 may be a continuous surface, such that the hollow body member 12 is cylindrical, or a series of panels such that the hollow body member 12 has any polygonal cross-sectional shape. Typically, from an ease of manufacture perspective, the sidewall 15 will form a generally tubular or cylindrical shape.

The particular polygonal shape of the hollow body member 12 is not critical to the function of the device 10. However, as described in greater detail below, the shape of an interior space 20 (which may be defined by the shape of the hollow body member 12) must be configured such that the dissolvable chemicals to be dissolved and dispersed using the device 10 are properly stacked, piled, or otherwise oriented in the interior space 20 of the device 10.

As also shown in FIG. 1, the device 10 includes a buoyance member 21. In the represented embodiment, the buoyancy member 21 surrounds a top portion of the hollow body member 12 around a central axis thereof, and a bottom portion of the hollow body member 12 extends below the buoyancy member 21 along the central axis. As such, the buoyance member 21 defines a sealed, annular compartment that surrounds the top portion of the hollow body member 12. However, alternative embodiments may include buoyance member(s) 21 of different shapes, a plurality of separate buoyance members 21, and/or buoyance member(s) 21 with a plurality of sealed compartments. When the device 10 is placed in a body of water, the buoyance member 21 is configured to provide sufficient buoyance for the device 10 such that the top end 13 and the top end 13 of the hollow body member 12 preferentially remains above the waterline 19, and the bottom end 17 of the hollow body member 12 preferentially remains below the waterline 19. Notably, the waterline 19 shown in FIG. 1 is exemplary, and the waterline 19 may be located higher or lower relative to the device 10 depending on the configuration of the device 10 and/or the amount and weight of the dissolvable chemical loaded in the device 10.

Figure 2:
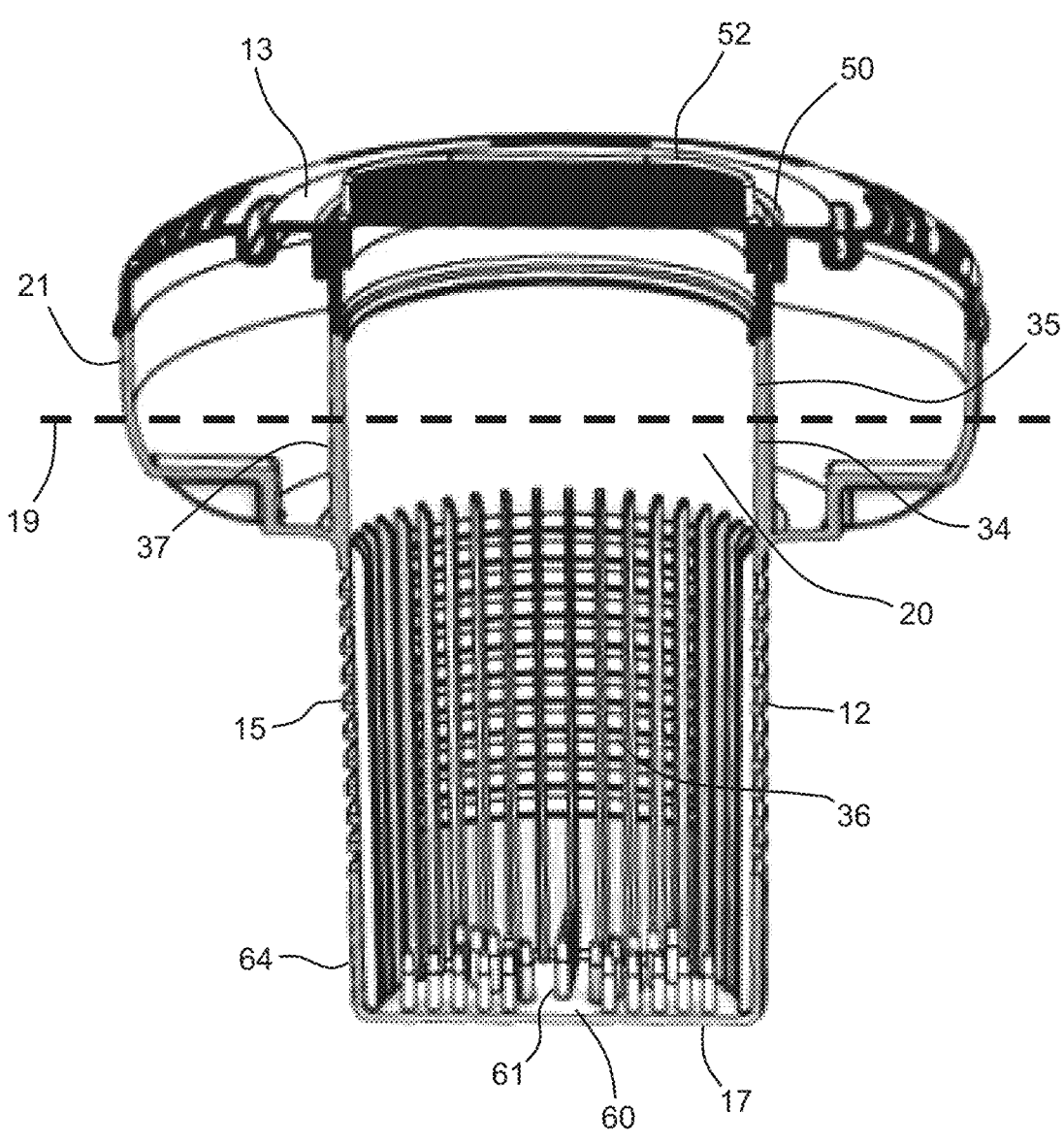
FIG. 2 shows a cross-sectional, side view of the chemical dispenser of FIG. 1.
Figure 4:
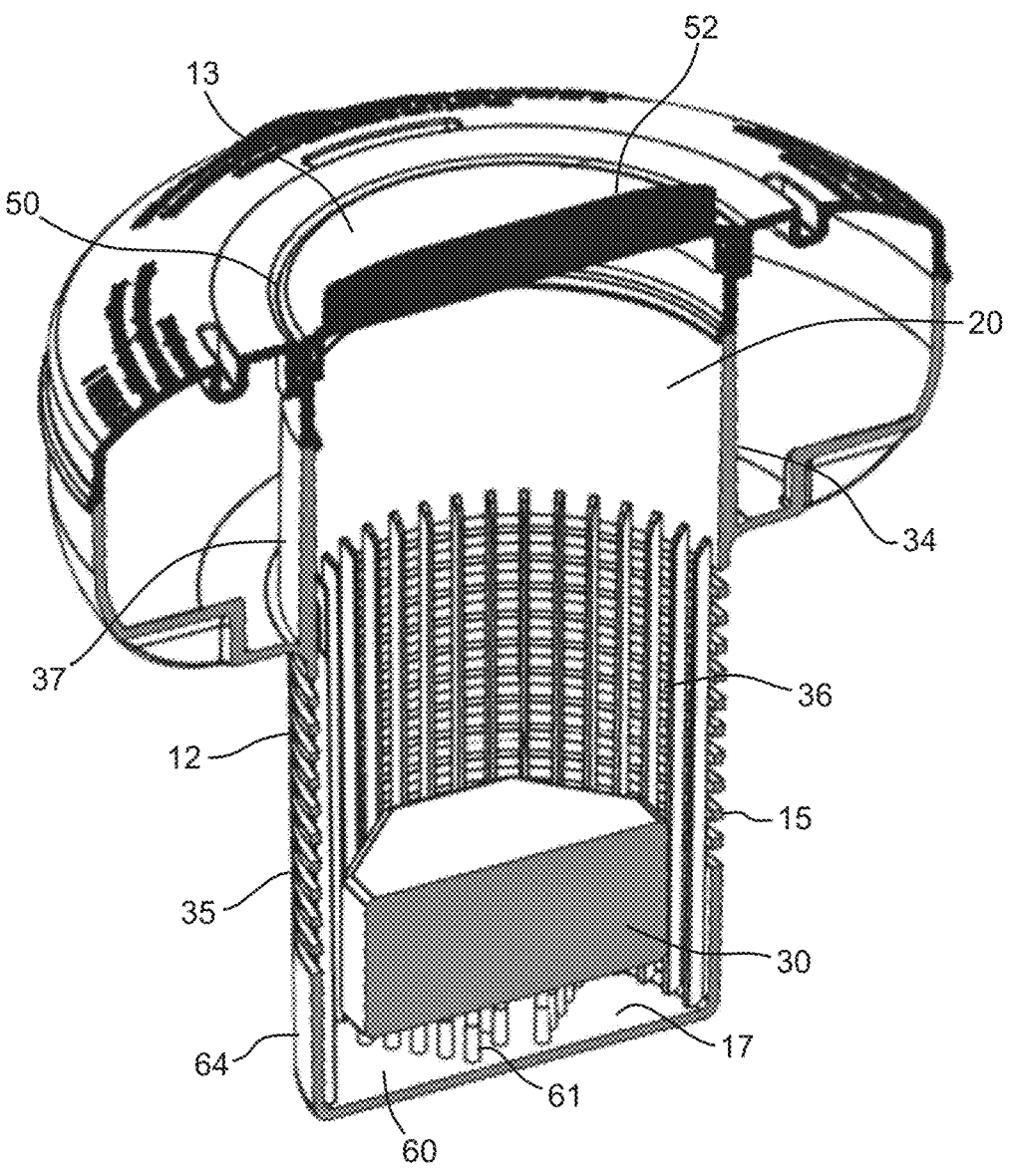
FIG. 4 shows a cross-sectional, perspective view of the chemical dispenser of FIG. 1 with a chemical tablet located therein.

FIG. 2 shows a cutaway view of the device 10 exemplified in FIG. 1. As shown in FIG. 2, the top end 13, bottom end 17, and sidewall 15 of the hollow body member 12 define the interior space 20 inside the hollow body member 12. The interior space 20 is configured to hold a vertical stack, pile, or the like of the dissolvable chemical. Preferably, the dissolvable chemical is in the form of a plurality solid tablets, which are stacked perpendicularly relative to the bottom end 17. FIG. 4 represents a single solid tablet 30 in the interior space 20 for reference.

The interior space 20 has a first portion 35 and a second portion 34. The first portion 35 is generally defined by the volume of the interior space 20 above the waterline 19, and the second portion 34 is generally defined by the volume of the interior space 20 below the waterline 19. As mentioned previously, the waterline 19 shown in FIG. 1 may be located higher or lower relative to the device 10 depending on the configuration of the device 10 and/or the amount and weight of the dissolvable chemical loaded therein. As such, it will be understood that the respective volumes of the first portion 35 and the second portion 34 may vary depending on the level of the waterline 19.

The second portion 34 below the waterline 19 is fluidically accessible to surrounding water via openings/apertures 36 in the sidewall 15 of the hollow body member 12. When placed in a body of water, water flows through the openings/apertures 36 in the sidewall 15 into the interior space 20, where the water dissolves the loaded dissolvable chemical (e.g., tablet 30). However, water that enters the interior space 20 through the openings/apertures 36 does not rise above the waterline 19, and thus does not contact any of the dissolvable chemical located in the first portion 35 of the interior space 20 above the waterline 19. Consequently, while sufficient dissolvable chemical is located underneath the dissolvable chemical above the waterline 19, the dissolvable chemical above the waterline 19 avoids contact with water and consequent dissolution. However, when dissolvable chemical below the waterline 19 dissolve or partially dissolve, the dissolvable chemical above the waterline 19 begins to settle below the waterline 19. This in turn causes the dissolvable chemical originally above the waterline 19 to begin dissolving, or to dissolve at a greater rate.

As shown in FIG. 2, in some examples, the openings/apertures 36 do not extend along the entire length of the sidewall 15. For example, as shown in FIG. 2, a lower portion 37 of the sidewall 15 is solid or covered such that the lower portion 37 does not include any of the openings/apertures 36. Any dissolvable chemical surrounded by this lower portion 37 of the sidewall 15 but that are underneath the waterline 19 may receive less water flow than dissolvable chemical surrounded by portions of the sidewall 15 with the openings/apertures 36. Thus, the surrounded dissolvable chemical may experience a desired, reduced dissolution rate compared to the dissolvable chemical above.

The openings/apertures 36 may be configured in any manner known in the art to allow adequate water flow into the interior space 20. The openings/apertures 36 may be a series of regularly shaped and/or dispersed holes in the sidewall 15. In certain embodiments, the openings/apertures 36 are defined by a series of interwoven, grid-like members to form a basket-like wall.

In various embodiments, at least 30% of the submerged second portion 34 of the hollow body member 12 is open space defined by the openings/apertures 36. In certain embodiments, at least 40% of the submerged second portion 34 is open space defined by the openings/apertures 36. In some embodiments, at least 45% of the submerged second portion 34 is open space defined by the openings/apertures 36. Such a large area defined by the openings/apertures 36 means that the device 10 may permit far higher dissolution rates when compared to existing chemical dispersal floaters. However, because the device 10 may include dissolvable chemical above the waterline 19, which is held in reserve until the dissolvable chemical therebelow dissolves, the device 10 may disperse a high concentration of the chemical solution for a prolonged period of time.

As also shown in FIG. 2, the device 10 may include a cap 52 adapted to cover an opening 50 in the top end 13 of the hollow body member 12 and configured to form a watertight connection with the top end 13 of the hollow body member 12.

Figure 5:
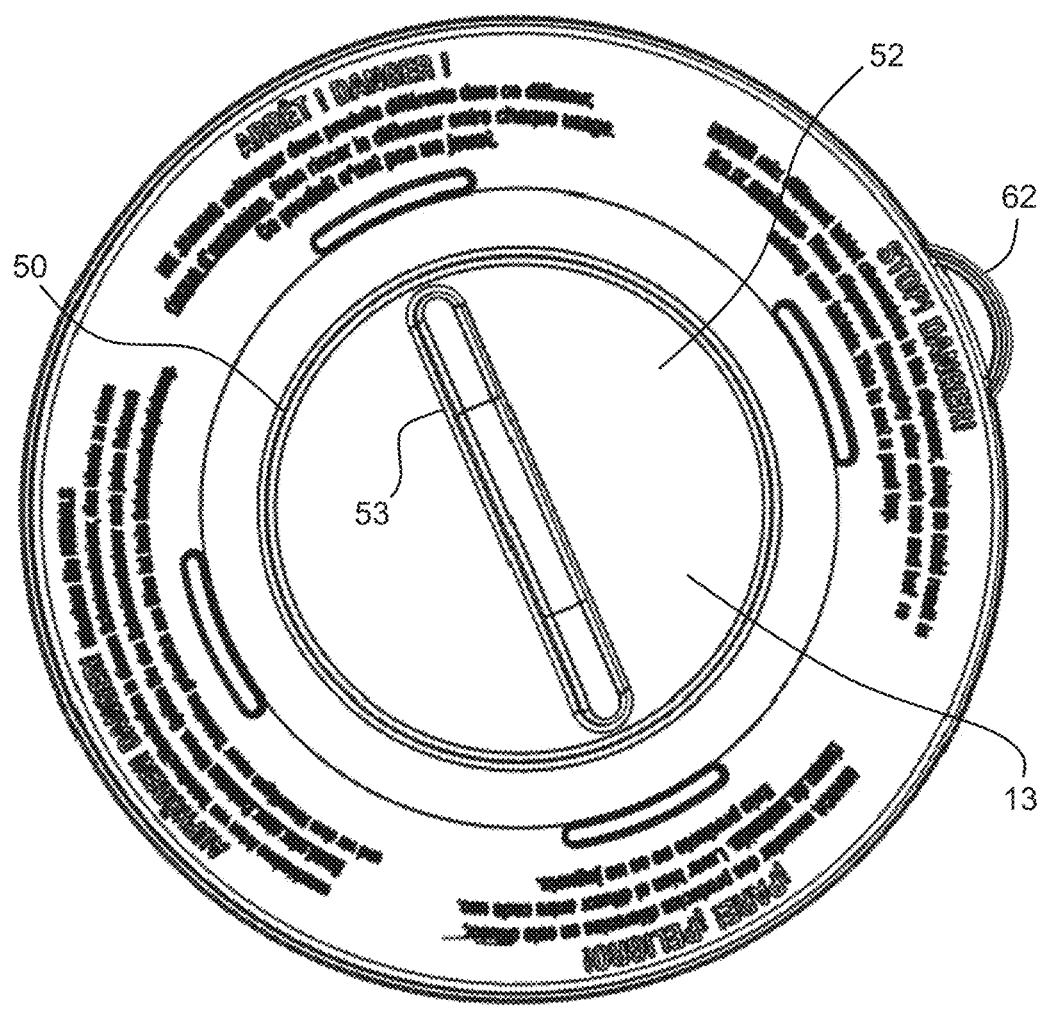
FIG. 5 shows a top-down view of the chemical dispenser of FIG. 1 and its cap.
Figure 6:
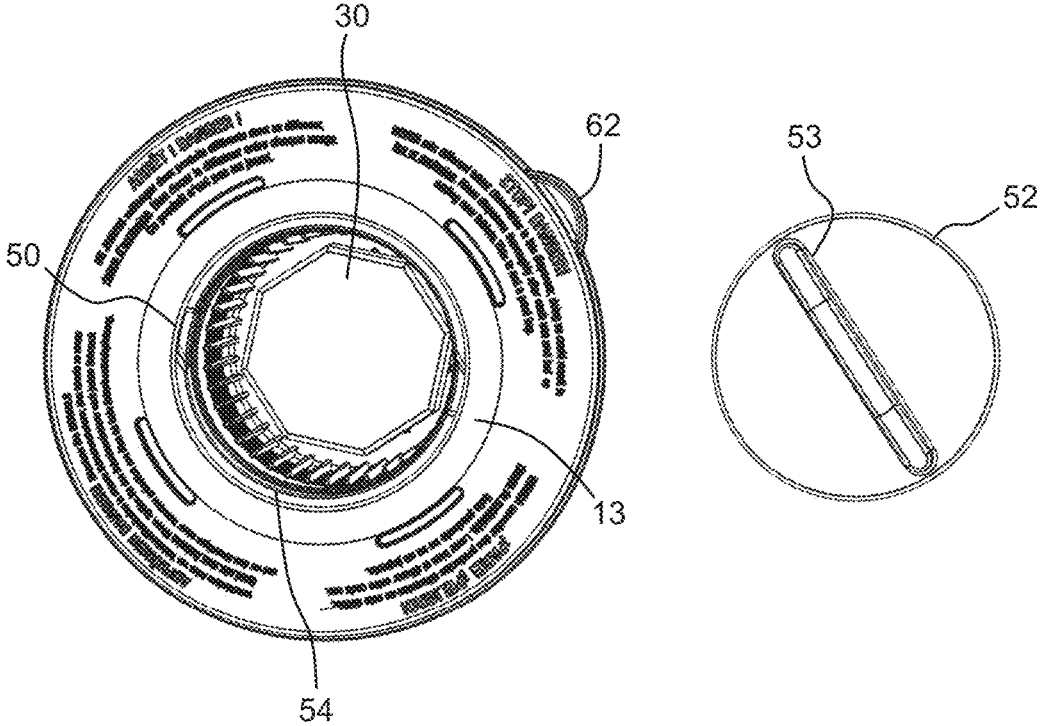
FIG. 6 shows a top-down view of the chemical dispenser of FIG. 1 with its cap removed and a chemical tablet located within the dispenser.

FIGS. 5 and 6 provide top-down views of the device 10. As shown, in certain embodiments, the cap 52 is completely removable from the device 10. The cap 52 may include a handle 53. Alternatively, the cap 52 may remain affixed to device 10, even when opened (e.g., through the use of a hinging mechanism). The cap 52 may be removable from the top end 13, which permits access to the interior space 20 and is sized such that the dissolvable chemical may be inserted into the interior space 20. Any suitable means may be used to create the watertight seal.

In certain embodiments, the cap 52 and/or opening 50 includes an associated seal, such as a rubber ring. In certain aspects, the cap 52 includes threads that can interact with complementary threads 54 on the top end 13 of the hollow body member 12. The threads may be conventional threads which requires the cap 52 to be turned one or more turns to attach the cap 52 to the top end 13 of the hollow body member 12. Alternatively, the threads 54 may be bayonet or similar type threads, which allow the cap 52 to be placed on the top end 13 and sealed with a partial turn of the cap 52, such as a one-eight, one-quarter, one-half, or a three-quarter turn of the cap 52. If bayonet type threads are used, the threads on the cap 52 must be made to complement the threads 54 on the top end 13 of the hollow body member 12. It is noted that other means to secure the cap 52 to the top end 13 may be used without departing from the scope of the present invention. In some embodiments, the cap 52 may include various child resistant securing means configured to impede access to the opening 50 by a child. The cap 52 may optionally include a tether attachment portion 62 (e.g., tether loop) for securing a tether (e.g., twine, rope, etc.) to the device 10.

Figure 3:
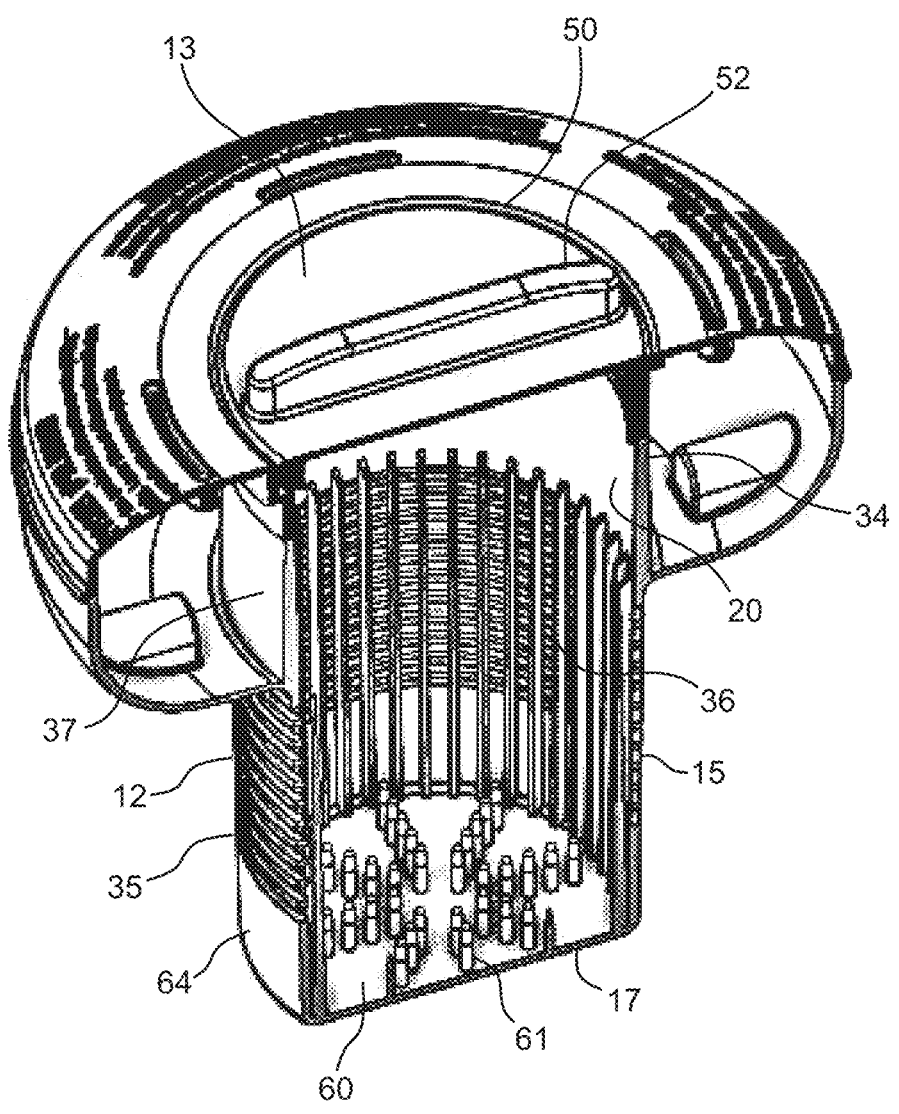
FIG. 3 shows a cross-sectional, perspective view of the chemical dispenser of FIG. 1.

Referring to FIGS. 2-4, in the device 10, the dissolvable chemical is generally inserted into the interior space 20 through the opening 50. The dissolvable chemical may be the dissolvable chemical itself (e.g., in the form of tablets) or the dissolvable chemical may be located in a cartridge. In certain embodiments, the size and shape of the opening 50 may be tailored so that the device 10 accepts only a specific type of dissolvable chemical or cartridge. This may promote use of only an appropriate chemical product in the device 10. In certain aspects, the device 10 employs a cartridge that is adapted to being inserted into the interior space 20 of the hollow body member 12 and the interior space 20 is adapted to receive the cartridge. Alternatively, the dissolvable chemical may be a unitary structure.

As shown in FIGS. 2-4, and 6, in certain embodiments, the bottom end 17 includes an interior surface 60 that defines a lowermost surface of the interior space 20. In certain embodiments, portions of the dissolvable chemical rest on this interior surface 60 (e.g., the lowermost tablet 30). Alternatively, the interior surface 60 may include one or more protrusions 61 extending from the interior surface 60 on which the portions of the dissolvable chemical may rest.

Figure 7:
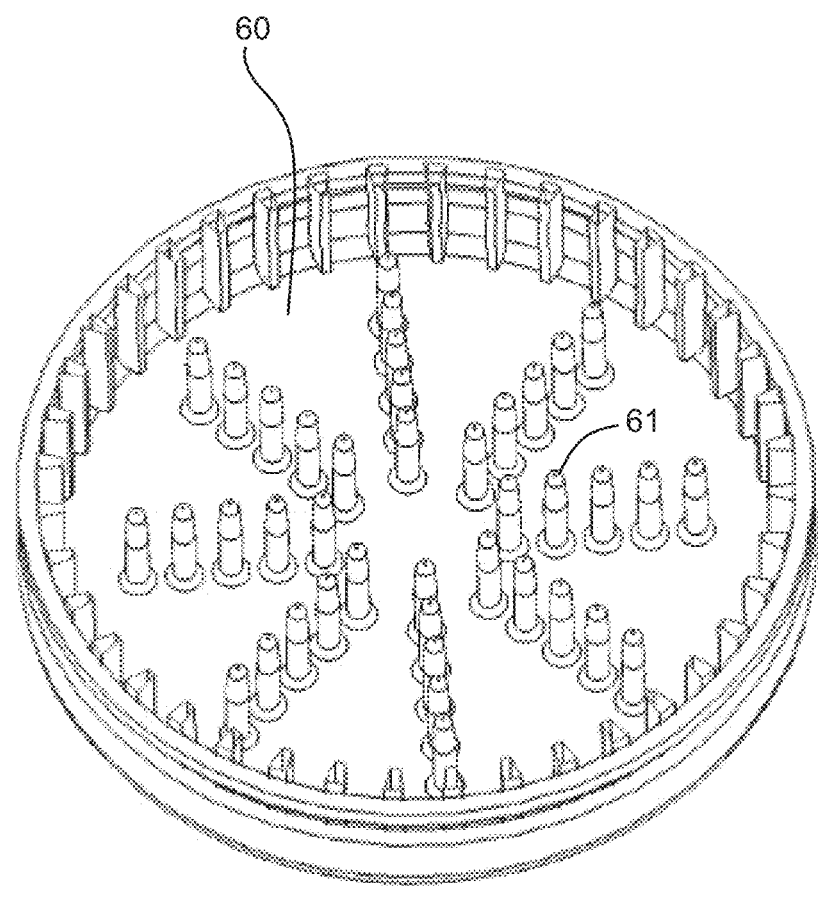
FIG. 7 shows an isolated, perspective view of a bottom portion of the chemical dispenser of FIG. 1.

FIG. 7 provides a closeup view of the bottom end 17 and its protrusions 61. As shown, the protrusions 61 may be tapered projections, which form pencil-shaped pedestals that contact the portions of the dissolvable chemical (e.g., the lowermost tablet 30) with minimal surface area. The minimal surface area supporting the dissolvable chemical allow for water to flow underneath the portions of the dissolvable chemical in contact therewith to assure dissolution of a bottom of the portions of the dissolvable chemical. This also allows the dissolution rate of the dissolvable chemical to be increased because the dissolvable chemical dissolves faster as compared to when the dissolvable chemical is not supported by the protrusions 61 due to the increased surface area of the dissolvable chemical in contact with the water. As shown in FIG. 4, when the bottom end 17 is solid and the dissolvable chemical is in the form of tablets, the protrusions 61 support the tablets away from the interior surface 60, such that the lateral sides of the tablets align with openings/apertures 36 in the sidewall 15.

In various embodiments, the bottom end 17 is solid, i.e., it does not contain the openings/apertures 36 like the sidewall 15. As shown in FIGS. 1-4, the bottom end 17 and lower areas of the sidewall 15 may define a catch cup portion 64 that does not include any of the openings/apertures 36 and is configured to retain therein any undissolved particles remaining from the dissolvable chemical for subsequent disposal. In some embodiments, the catch cup portion 64 defines at least 10% of the sidewall 15, at least 20% of the sidewall 15, or at least 25% of the sidewall 15.

In certain embodiments, the bottom end 17 is removable, which may facilitate cleaning any chemical residue or scale that builds up on the bottom end 17. For example, the catch cup portion 64 may be threadedly coupled to the remainder of the sidewall 15.

In certain embodiments in which the dissolvable chemical is in the form of tablets, one or both of the interior space 20 and the dissolvable chemical are configured such that when the tablets are placed in the interior space 20, the tablets stack in a vertical orientation, fit through the opening 50, and allow the cap 52 to be placed and create a watertight seal without interference from the stacked tablets. Generally, the shape of the tablets and the interior space 20 are complementary, meaning they will each have a shape that allow proper placement in the interior space 20 in a stacked orientation.

The dissolvable chemical will typically be a solid water treating chemical, such as a disinfectant, an algaecide or other water treating chemical commonly used in managed water bodies such as, but not limited to, pools and spas. The dissolvable chemical may be, for example, a bromine releasing chemical, a chlorine releasing chemical, a peroxide releasing chemical, a biguanide releasing chemical, and/or another water treating material releasing chemical. The dissolvable chemical may be, for example, a sanitizer, an algaecide, a clarifier, a pH adjustment, or a water balancer. One particular water treatment chemical is calcium hypochlorite, in a slow dissolving form, such as one having a high lime content. An example of this slow dissolving calcium hypochlorite is described in US Patent Application Publication 2016/0330972 A1, which is hereby incorporated by reference.

In various embodiments, the device 10 is adapted to accept dissolvable chemical of a plurality of different chemical compositions and/or dissolution rates. For example, in some embodiments in which the dissolvable chemical is in the form of tablets, the lowermost tablet(s) may be relatively quick dissolving tablet(s) to provide an initial shock treatment for a body of water. As these lowermost tablet(s) dissolve, slower dissolving tablet(s) above them fall below the waterline 19, and provide a slower, continual dissolution of chemicals to maintain a sufficiently disinfecting concentration. Similarly, the tablets can be of different composition to provide a body of water with a series of unique chemical treatments that automatically follow one another according to dissolution.

In various embodiments, the interior space 20 is configured to receive two or more stacked tablets of the dissolvable chemical. In some embodiments, the device 10 is configured to receive 2, 3, 4, 5, 6, 7, 8, 9, or 10 tablets of the dissolvable chemical. In one example, the interior space 20 may be configured to receive four stacked tablets dissolvable chemical. In such example, the interior space 20 is configured so that when the four tablets of the dissolvable chemical are placed into the interior space 20 and inserted onto a body of water, prior to dissolution one or more of the tablets are located above the waterline 19 in the first portion 35 of the interior space 20. In various embodiments, the tablets of the dissolvable chemical have an octagonal shape, have a dimension corner-to-corner of about 3 inches (i.e., about 7.6 cm), and a weight of about 250 to 285 grams.

In various embodiments, the total weight of the dissolvable chemical within the device 10 is between about 1000 to 1150 grams when the device 10 is completely full. In some embodiments, when the device 10 is placed in water and the interior space 20 is completely full of the dissolvable chemical (e.g., four tablets in a stack having a weight of about 1000 grams), an entirety of the dissolvable chemical completely dissolves after at least six days. In some embodiments, the entirety of the dissolvable chemical completely dissolves after at least seven days. In some embodiments, the entirety of the dissolvable chemical completely dissolves after at least eight days.

In addition, the device 10 may be used in conjunction with other water treatment devices, such as liquid chemical dispensing device, a chlorine generating device, an active hydroxyl generating device, an ozone generating device, an ultraviolet light device and the like. The additional devices may be separate units or built into a single unit. These additional devices may be in parallel or in series with the device 10.

In various embodiments, the hollow body member 12 and/or the buoyance member 21 are made using a polymeric material. Nonlimiting examples include, but are not limited to, various thermoplastic elastomers, such as ABS, PP, HDPE, PE, PVC, and PC. In some embodiments, one or more components of the device 10, such as the hollow body member 12 and the buoyance member 21 are manufactured as separate pieces that are then joined. Preferably, all parts of the device 10, excluding the cap 52, are manufactured as a monolithic entity to reduce manufacturing and assembly steps and provide more durability to the device 10.

The device 10 provides for a method of treating water that includes, for example, locating a dissolvable chemical (e.g., one or more tablets perpendicularly stacked) within the interior space 20 of the device 10. The dissolvable chemical may be inserted through the top end of the device 10, such as through the opening 50. The method may include removing the cap 52 prior to inserting the dissolvable chemical and sealing the opening 50 with the cap 52 after the dissolvable chemical has been inserted. The method includes placing the device 10 on a surface of a body of water such that the device 10 floats on the surface in a manner such that the top portion 35 of the interior space 20 remains above the waterline 19 and the bottom portion 34 of the interior space 20 submerges below the waterline 19.

The method includes dissolving the dissolvable chemical within the device 10 in water that enters the interior space 20 through the openings/apertures 36 to produce the chemical solution and simultaneously treating the body of water with the chemical solution as the chemical solution exits the openings/apertures 36. In various embodiments, dissolution or partial dissolution of the dissolvable chemical tablets below the waterline 19 causes at least some of the dissolvable chemical in the first portion 35 of the interior space to fall below the waterline 19.

In some embodiments, the method may include cleaning the catch cup portion 64, for example, by removing and izationizationization izationization ization

---

9     10 disposing of undissolved solids therein. In such embodiments, the method may include removing the catch cup portion 64 from the remainder of the device 10 prior to cleaning.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A chemical dispenser comprising:

a hollow body member including a bottom end configured to be disposed below a waterline and a top end configured to be disposed above the waterline, the hollow body member defining an interior space disposed between the bottom end and the top end, the interior space configured to accept, through the top end, and hold therein a dissolvable chemical; and a buoyancy member surrounding the hollow body member and configured to provide buoyancy to the chemical dispenser when the chemical dispenser is placed in a body of water such that a first portion of the interior space remains above the waterline, a second portion of the interior space submerges below the waterline, and a third portion of the interior space submerges below the waterline, wherein the hollow body member is configured such that when the interior space is filled with the dissolvable chemical, prior to dissolution, at least some of the dissolvable chemical is above the waterline in the first portion of the interior space, where an opening in the hollow body member allows sufficient water flow into the interior space below the waterline such that dissolution or partial dissolution of the dissolvable chemical below the waterline occurs, wherein the hollow body member is configured to, when the chemical dispenser is in the body of water, provide a reduced water flow to the third portion of the interior space relative to the second portion of the interior space.

2. The chemical dispenser of claim 1, wherein the bottom end comprises an interior surface defining a bottom of the interior space, the interior surface comprising one or more protrusions extending therefrom on which the dissolvable chemical is supported, wherein the one or more protrusions are configured such that water can flow underneath portions of the dissolvable chemical that is in contact with the one or more protrusions when the dissolvable chemical is in the interior space.

3. The chemical dispenser of claim 1, wherein the hollow body member has a central axis, the buoyancy member surrounds the top end of the hollow body member around the central axis, and the bottom end of the hollow body member extends below the buoyancy member along the central axis and remains submerged when the chemical dispenser is placed in the body of water.

4. The chemical dispenser of claim 3, wherein at least 30% of the second portion is open space defined by the opening.

5. The chemical dispenser of claim 1, wherein the interior space is configured to receive a stack of two or more tablets of the dissolvable chemical.

6. The chemical dispenser of claim 1, wherein the hollow body member and/or the buoyancy member comprise a thermoplastic elastomer.

7. The chemical dispenser of claim 1, wherein the dissolvable chemical includes a water treating material releasing chemical.

8. The chemical dispenser of claim 1, further comprising an opening in the top end of the hollow body member configured to allow access to the interior space and a cap adapted to cover the opening in the top end and form a watertight connection, wherein the cap is removable from the top end of the hollow body member to provide the access to the interior space.

9. The chemical dispenser of claim 1, further comprising a catch cup portion adjacent the bottom end of the hollow body member that does not include the opening, the catch cup portion configured to retain undissolved solids within the hollow body member.

10. A chemical dispenser comprising:

a tubular container including a sidewall, a bottom end configured to be disposed below a waterline, and an open top end configured to be disposed above the waterline;

an interior space defined by the tubular container between the bottom end and top end, the interior space configured to accept through the open top end a dissolvable chemical, wherein the tubular container is configured such that when the interior space is filled with the dissolvable chemical, prior to dissolution, at least some of the dissolvable chemical is above the waterline in the first portion of the interior space, an annular buoyancy member surrounding the tubular container to provide buoyancy to the chemical dispenser such that when placed on a body of water a first portion of the interior space proximal to the open top remains above the waterline, a second portion of the interior space proximal to the first portion remains below the water line, and a third portion of the interior space proximal to the bottom end remains below the waterline; and apertures defined in the sidewall surrounding the second portion of the interior space and configured to allow water flow into the interior space below the waterline, and to allow dissolution or partial dissolution of the dissolvable chemical below the waterline, wherein the apertures are not defined in the sidewall surrounding the third portion of the interior space, and wherein the hollow body member is configured to, when the chemical dispenser is in the body of water, provide a reduced water flow to the third portion of the interior space relative to the second portion of the interior space such that any of the dissolvable chemical disposed in the third portion dissolves at a reduced rate relative to any of the dissolvable chemical disposed in the second portion.

11. The chemical dispenser of claim 10, wherein the bottom end comprises an interior surface defining a bottom of the interior space, the interior surface comprises one or more protrusions extending therefrom, wherein the one or more protrusions are configured such that water flows underneath and dissolves portions of the dissolvable chemical in contact with the one or more protrusions.

12. The chemical dispenser of claim 11, wherein the tubular container has a central axis, the annular buoyancy member surrounds the top end of the tubular container around the central axis, and the bottom end of the tubular container extends below the annular buoyancy member along the central axis and remains submerged when the chemical dispenser is placed in the body of water.

13. The chemical dispenser of claim 12, wherein at least 30% of the sidewall below the annular buoyancy member is open space defined by the apertures.

14. The chemical dispenser of claim 10, wherein the interior space is configured to receive a stack of two or more tablets of the dissolvable chemical.

15. The chemical dispenser of claim 10, wherein when the chemical dispenser is placed in water with the dissolvable chemical, a total weight of the dissolvable chemical completely dissolves after at least six days.

16. The chemical dispenser of claim 10, wherein the dissolvable chemical includes a water treating material releasing chemical.

17. The chemical dispenser of claim 10, further comprising a cap adapted to cover the open top of the tubular container and form a watertight connection, wherein the cap is removable from the tubular container to reveal an opening into the interior space.

18. The chemical dispenser of claim 10, further comprising a catch cup portion adjacent the bottom end of the tubular container that does not include the apertures, the catch cup portion configured to retain undissolved solids within the tubular container.

\* \* \* \* \*